United States Patent
Arahira

(10) Patent No.: US 8,676,063 B2
(45) Date of Patent: *Mar. 18, 2014

(54) QUANTUM CORRELATED PHOTON PAIR GENERATING DEVICE AND METHOD

(75) Inventor: Shin Arahira, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 124 days.

This patent is subject to a terminal disclaimer.

(21) Appl. No.: 13/196,954

(22) Filed: Aug. 3, 2011

(65) Prior Publication Data

US 2012/0051740 A1 Mar. 1, 2012

(30) Foreign Application Priority Data

Aug. 27, 2010 (JP) ................................. 2010-191077

(51) Int. Cl.
*H04B 10/04* (2011.01)
*H04B 10/12* (2011.01)

(52) U.S. Cl.
USPC ............................ 398/197; 398/195; 398/182

(58) Field of Classification Search
USPC ................. 398/182, 200, 201, 192, 195, 197; 380/256
See application file for complete search history.

(56) References Cited

U.S. PATENT DOCUMENTS

| | | | |
|---|---|---|---|
| 2009/0180616 A1* | 7/2009 | Brodsky et al. | 380/256 |
| 2010/0079833 A1* | 4/2010 | Langford et al. | 359/107 |
| 2010/0226659 A1* | 9/2010 | Nishioka et al. | 398/154 |
| 2011/0051227 A1* | 3/2011 | Arahira | 359/328 |
| 2011/0073783 A1* | 3/2011 | Arahira | 250/493.1 |
| 2011/0211244 A1* | 9/2011 | Peters et al. | 359/227 |
| 2012/0051755 A1* | 3/2012 | Arahira | 398/158 |

FOREIGN PATENT DOCUMENTS

| | | |
|---|---|---|
| JP | 2003-228091 A | 8/2003 |
| JP | 2005-258232 A | 9/2005 |

OTHER PUBLICATIONS

Han Chuen Lim et al. "Stable source of high quality telecom-band polarization-entangled photon-pairs based on a single, pulse-pumped, short PPLN waveguide." Optics Express vol. 16, No. 17, pp. 12460-12468, Aug. 18, 2008.

* cited by examiner

*Primary Examiner* — Daniel Dobson
(74) *Attorney, Agent, or Firm* — Rabin & Berdo, P.C.

(57) ABSTRACT

A quantum correlated photon pair generating device includes a nonlinear optical medium that generates quantum correlated photon pairs from excitation light by spontaneous parametric fluorescence and generates auxiliary idler light from the excitation light and auxiliary signal light by stimulated parametric conversion. The excitation light and auxiliary signal light are generated separately, combined, and input simultaneously to the nonlinear optical medium. An optical demultiplexer separates the auxiliary signal light and the auxiliary idler light output from the nonlinear optical medium. The intensities of the output auxiliary signal light and auxiliary idler light are detected, and the intensity or wavelength of the excitation light or the temperature of the nonlinear optical medium is controlled to maintain the ratio of the detected intensities at a preset value. The rate at which the quantum correlated photon pairs are generated is thereby held steady.

9 Claims, 8 Drawing Sheets

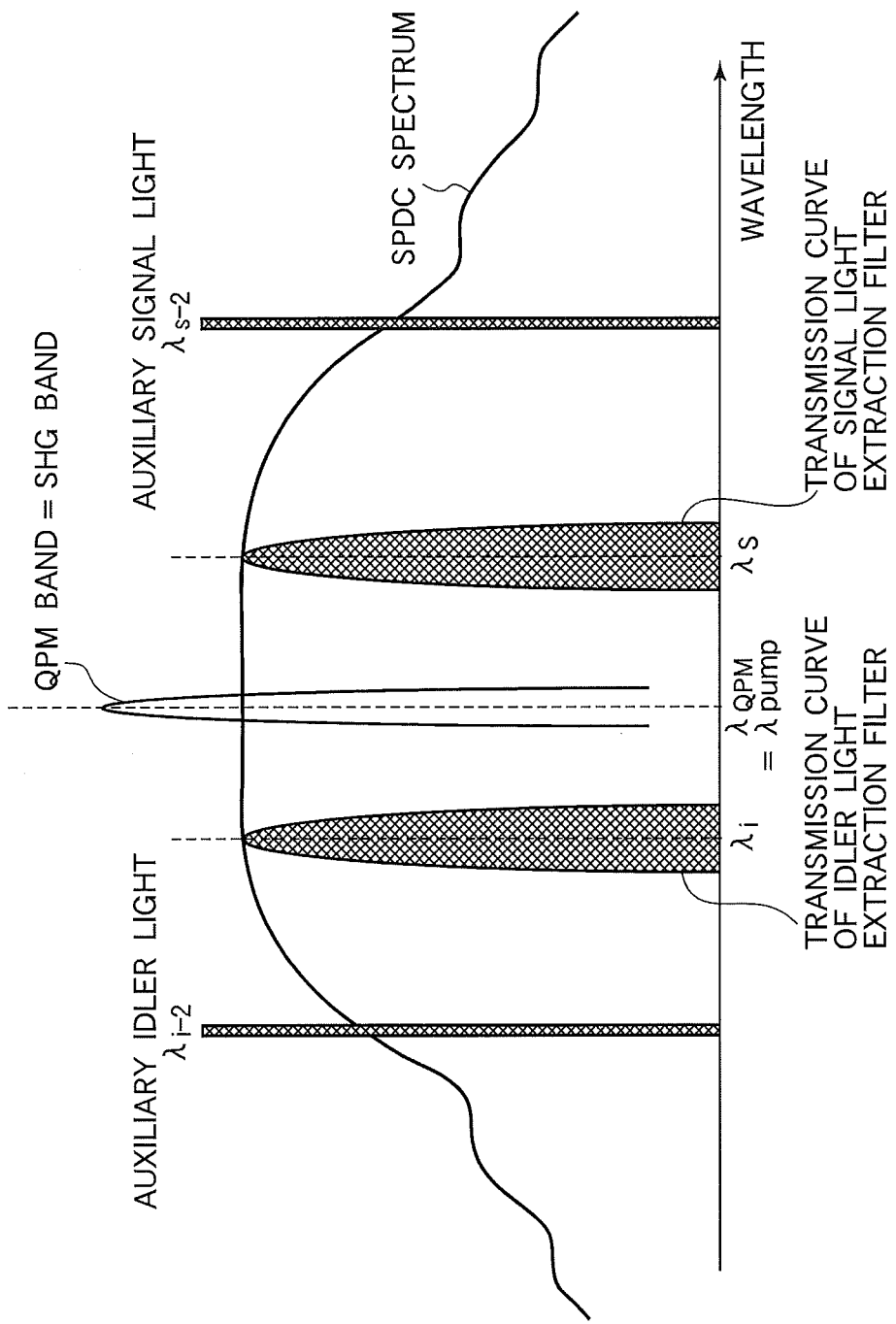

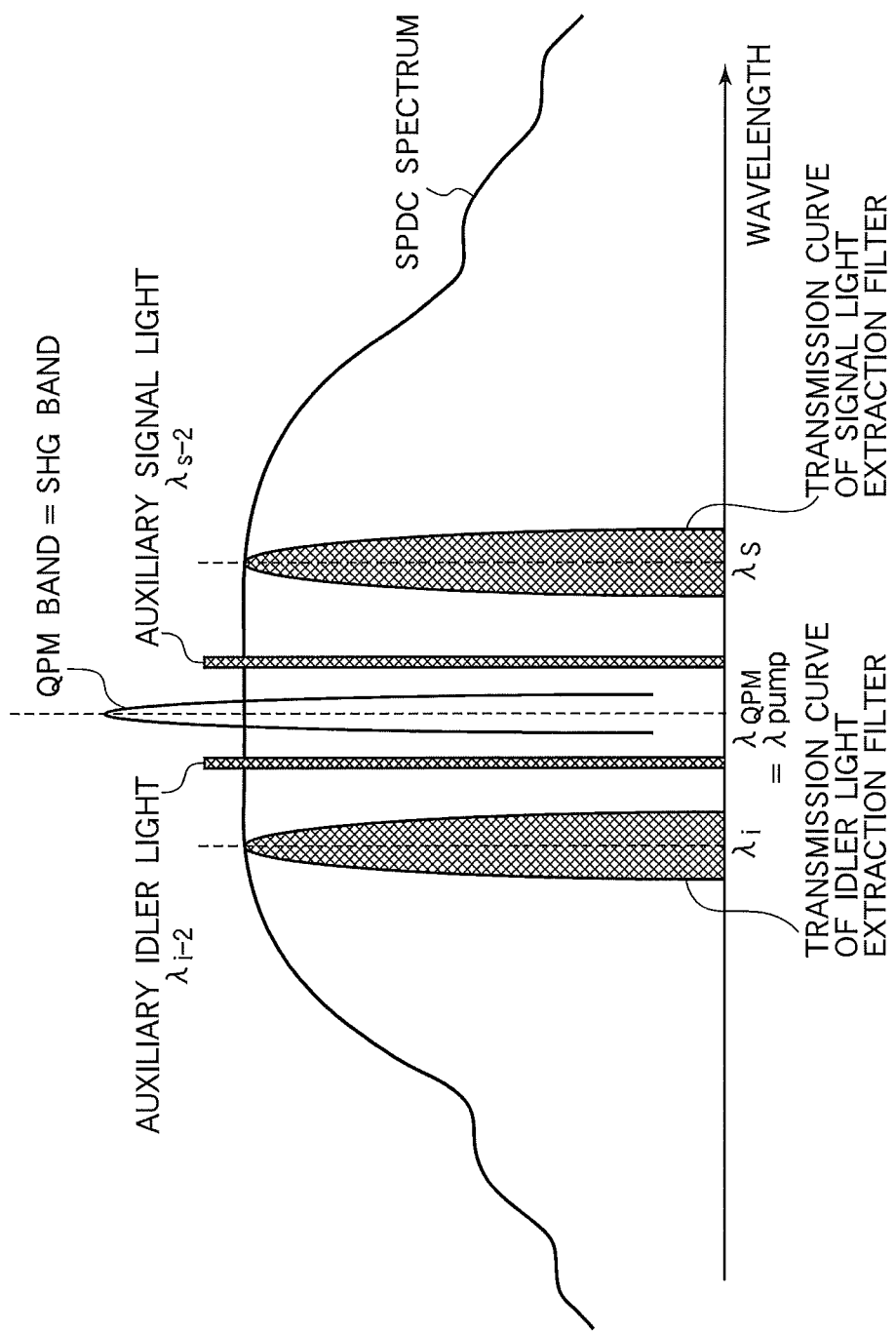

QUANTUM CORRELATED PHOTON PAIR GENERATING DEVICE AND METHOD

BACKGROUND OF THE INVENTION

1. Field of the Invention

The present invention relates to methods and devices for generating the correlated photon pairs needed for information communication techniques that exploit the quantum mechanical correlation of photons. More particularly, the invention relates to methods and devices that enable quantum correlated photon pair generation to be indirectly monitored and controlled according to the monitoring results.

2. Description of the Related Art

In recent years quantum cryptography, quantum computing, and other quantum information and communication technologies using quantum mechanical physical phenomena have been attracting attention. Information communication systems that exploit the quantum non-locality of photon pairs are starting to come into practical use. An essential element of such systems is a reliable source of quantum correlated photon pairs, often referred to as entangled photon pairs.

One method that has been used to generate quantum correlated photon pairs is spontaneous parametric fluorescence in second-order or third-order nonlinear optical media, as illustrated in FIG. 1. In spontaneous parametric fluorescence, input of excitation light (pump light) of wavelength $\lambda_p$, wavenumber $k_p$, and angular oscillation frequency $\omega_p$ to a second-order or third-order nonlinear optical medium 10 produces output of signal photons of wavelength $\lambda_s$, wavenumber $k_s$, and angular oscillation frequency $\omega_s$ and idler photons of wavelength $\lambda_i$, wavenumber $k_i$, and angular oscillation frequency $\omega_i$. The signal and idler photons are always generated in pairs.

When a second-order nonlinear optical medium is used, the wavenumbers and angular oscillation frequencies of the excitation light, signal photons, and idler photons satisfy the following relations (1) and (2), which are equivalent to the laws of conservation of momentum and energy, respectively.

$$k_p = k_s + k_i + K \quad (1)$$

$$\omega_p = \omega_s + \omega_i \quad (2)$$

Spontaneous parametric fluorescence in a second-order nonlinear optical medium is also known as spontaneous parametric down-conversion (SPDC).

Spontaneous parametric fluorescence in a third-order nonlinear optical medium is also known as spontaneous four-wave mixing (SFWM). The wavenumbers and angular oscillation frequencies of the photons satisfy the following relations (3) and (4).

$$2k_p = k_s + k_i + K \quad (3)$$

$$2\omega_p = \omega_s + \omega_i \quad (4)$$

The quantity K in equations (1) and (3) is a parameter corresponding to the period of the periodically modulated structure of the nonlinear optical medium. Nonlinear optical media with periodically modulated structures are frequently used nowadays to produce more efficient nonlinear optical effects by quasi-phase matching, as in the cases described below in which a lithium niobate ($LiNbO_3$) crystal is used as the nonlinear optical medium.

Aside from the wavenumber and angular oscillation frequency relations given above, the signal photons and idler photons are also correlated by polarization. A correlated or entangled photon pair including a signal photon and an idler photon is properly referred to as a quantum correlated photon pair or simply as a correlated photon pair. The latter term will be used below.

A quantum correlated photon pair generating device is a device for generating correlated photon pairs. The following are some classical methods of obtaining correlated photon pairs.

In U.S. Pat. No. 7,211,812 (Japanese Patent Application Publication No. 2003-228091, now Japanese Patent No. 4098530), Takeuchi describes a quantum entangled photon pair generating device using $\beta$-$BaB_2O_4$ (BBO) crystals as second-order nonlinear optical media. Two BBO crystals are aligned in series with a half-wave plate centered between them. Input of linearly-polarized excitation light (pump light) with a wavelength of 351.1 nm produces spontaneous parametric down conversion in the BBO crystals, generating quantum correlated photon pairs with a wavelength equal to twice the wavelength of the excitation light (equal to 702.2 nm). The two photons in each pair are referred to as the signal photon and the idler photon. When the intensity of the excitation light is sufficiently weak and the probability of the occurrence of spontaneous parametric down conversion in both BBO crystals simultaneously is negligible, the device outputs a signal photon beam and an idler photon beam in which each photon in each beam could been generated in either of the two BBO crystals. The state of a correlated photon pair generated by this device is a superposition of two states: one state in which the two photons were generated in one of the BBO crystals, and another state in which the two photons were generated in the other BBO crystal.

The half-wave plate in this device rotates the polarization of the photons generated in the first BBO crystal by 90°, so photon pairs generated in different BBO crystals are polarized in mutually orthogonal planes. The signal and idler photons in each pair are said to be polarization entangled in that both give the same result when their polarization is measured in the same way.

Many other systems using similar structures to generate quantum entangled photon pairs with wavelengths in the 700-nm to 800-nm band have been reported. Generating entangled photon pairs with wavelengths in the 1550-nm band, which is the minimum absorption loss wavelength band of optical fibers, would be very useful in anticipation of long-haul quantum information communication systems.

In Japanese Patent Application Publication No. 2005-258232, Inoue describes a 1550-nm quantum entangled photon pair generating device using periodically poled lithium niobate (PPLN) waveguides as second-order nonlinear optical media. The device has a fiber loop structure incorporating two PPLN waveguides and a polarizing beam splitter (PBS). The two PPLN waveguides are placed so that their optical axes are mutually orthogonal. A femtosecond excitation light pulse with a wavelength of 775 nm and 45° plane polarization is input through the PBS, which splits it into photons having equal probabilities of being aligned in polarization with the axis of each PPLN waveguide. Like the BBO crystals described above, when the intensity of the excitation light is sufficiently weak, the PPLN waveguides generate quantum correlated photon pairs by spontaneous parametric down conversion, but the signal and idler photons have wavelengths of 1550 nm.

A 1550-nm wavelength quantum entangled photon pair generating device using a PBS and a polarization maintaining optical fiber loop with a single PPLN element has been described by Lim et al. in *Stable source for high quality telecom-band polarization-entangled photon pairs based on a single, pulse-pumped, short PPLN waveguide* (Optic Express, Vol. 16, No. 17, pp. 12460 to 12468, 2008). The polarization maintaining optical fiber loop also includes a fusion splice with a 90° twist. The PPLN waveguide generates quantum correlated photon pairs including signal photons with a wavelength of 1542 nm and idler photons with a wavelength of 1562 nm by spontaneous parametric down conversion. When the intensity of the excitation light is sufficiently weak, the state of each quantum correlated photon pair output from the PBS is a superposition of a state produced by clockwise travel around the loop and an orthogonally polarized state produced by counterclockwise travel.

There are also many reports of devices that generate quantum entangled photon pairs by spontaneous four-wave mixing, using third-order nonlinear optical media instead of the second-order nonlinear optical media employed in the devices described above. Zero-dispersion optical fiber, photonic crystal optical fiber, and more recently silicon wire optical waveguides have been used as the third-order nonlinear optical media.

To configure a practical system, its component devices and subsystems must be able to operate in a stable manner and maintain a specified state for an extended period of time. For example, the light source used in such a system must be capable of maintaining stable output power over an extended period of time.

Even when used under constant conditions, however, actual devices and systems undergo aging changes. It would therefore be desirable to detect whether or not the device or system has deviated from the specified state and use the deviation as feedback to restore the specified state.

The output of the semiconductor lasers and other light sources used in current optical communication systems is stabilized by the following method. Part of the light output from the light source is branched to a device that monitors its intensity, and if the intensity deviates from the specified value, the driving current is adjusted to restore the specified intensity. Alternatively, the light exiting one end of a semiconductor laser is used as output light and the light exiting the other end is monitored to perform a similar adjustment of the driving current.

A quantum correlated photon pair generating device used in a quantum information communication system must be able to generate correlated photon pairs at a stable rate over an extended period of time, and there is a need for a method of verifying that such stability is maintained.

The applications envisioned in the quantum information communication field, however, are predicated on the states of individual particles, that is, individual photons. In the quantum encryption field, for example, if a signal value were represented by multiple photon pairs per signal, it might be possible to eavesdrop by stealing some of the photons, seriously compromising the security of the encryption scheme. A quantum correlated photon pair generating device used in a quantum information communication system therefore ideally produces only one correlated photon pair at a time per signal channel.

The methods of stabilizing the output of the light sources used in existing optical communication systems are inapplicable to this type of ideal quantum correlated photon pair generating device, for the following reasons.

A first problem is that since in a quantum information communication system there is only one photon pair per signal, it is not possible to split off part of the photon pair for monitoring purposes. A further problem is that the act of monitoring, that is, measurement, changes the quantum state of the measured photons, and in quantum mechanics it is in principle impossible to copy the quantum state, so in quantum cryptography it would be impossible to deliver the correct information to the receiving party. In short, although there is a need to ensure that the quantum correlated photon pair generating device is maintaining stable operation in a specified state such as, for example, a state in which the continued stable production of single correlated photon pairs is maintained, no method that ensures this has been reported so far.

What is needed, accordingly, is an indirect method of monitoring the state, or more specifically the mean rate or expected value, of the generation of correlated photon pairs by a correlated photon pair generating device, and a method of controlling the correlated photon pair generation process based on such monitoring.

SUMMARY OF THE INVENTION

It occurred to the present inventor that if there were a physical quantity that could be generated independently from the correlated photon pairs but by a process having an expected value correlated with the expected probability of generation of the correlated photon pairs, then the expected probability of generation of the correlated photon pairs could be learned by measuring (monitoring) that physical quantity without affecting the generation of the correlated photon pairs. This would mean that the expected probability of generation of the correlated photon pairs could be detected indirectly without measuring the quantum state of the correlated photon pairs. Feedback based on the expected value of the indirectly measured physical quantity could then be used to create a quantum correlated photon pair generating device capable of maintaining stable output of the expected number of correlated photon pairs.

After diligent study, the inventor found that the efficiency of differential frequency generation (DFG) was such a physical quantity. DFG is a stimulated parametric fluorescence process that converts some fraction of input signal light to idler light when the signal light is mixed with excitation light. DFG conversion efficiency can be measured from the intensity of the output idler light, or the intensities of the output signal light and output idler light. When DFG and a spontaneous parametric fluorescence process take place simultaneously in the same nonlinear optical medium, the DFG conversion efficiency is correlated with the expected probability of the generation of correlated photon pairs by the spontaneous parametric fluorescence process. If the wavelengths of the signal and idler light involved in the DFG process differ from the wavelengths of the correlated photon pairs produced by the spontaneous parametric fluorescence process, the DFG conversion efficiency can be measured without disturbing the spontaneous parametric fluorescence process or affecting the quantum state of the correlated photon pairs.

One object of the present invention is accordingly to provide a method of indirectly monitoring the output rate of a correlated photon pair generation process and controlling the correlated photon pair generation process on the basis of the monitoring result.

Another object is to provide a quantum correlated photon pair generating device capable of using this method to maintain stable output of correlated photon pairs at a fixed expected rate.

The invention provides the following novel quantum correlated photon pair generating methods and device.

A first novel correlated photon pair generation method includes a first step of simultaneous input of excitation light and auxiliary signal light to a nonlinear optical medium, and a second step of detecting the intensities of auxiliary signal light and auxiliary idler light output from the nonlinear optical medium and holding their intensity ratio at a preset value by controlling at least one of the intensity of the excitation light, the wavelength of the excitation light, and the temperature of the nonlinear optical medium.

A second novel correlated photon pair generation method includes a first step of simultaneous input of excitation light and auxiliary signal light to a nonlinear optical medium, and a second step of detecting the intensity of auxiliary idler light output from the nonlinear optical medium and holding the intensity of the auxiliary idler light at a preset value by controlling at least one of the intensity of the excitation light, the wavelength of the excitation light, and the temperature of the nonlinear optical medium.

The novel correlated photon pair generating device includes a nonlinear optical medium, an excitation light source that outputs excitation light, an auxiliary signal light source that outputs auxiliary signal light, an optical combiner that combines the excitation light and the auxiliary signal light and outputs the combined light, a first optical coupler that couples the combined light output from the optical combiner into the nonlinear optical medium, a second optical coupler that couples the output light output from the nonlinear optical medium, an optical demultiplexer that separates and outputs the auxiliary signal light component and the auxiliary idler light component included in the output light output from the second optical coupler, a first photodetector that detects the intensity of the auxiliary signal light component, a second photodetector that detects the intensity of the auxiliary idler light component, and a control signal generator.

Input of the excitation light causes the nonlinear optical medium to generate quantum correlated photon pairs including respective photons of signal light and idler light by spontaneous parametric fluorescence. The additional input of the auxiliary signal light causes the nonlinear optical medium to generate auxiliary idler light by a stimulated parametric conversion process.

The control signal generator generates a control signal for controlling at least one of the intensity of the excitation light, the wavelength of the excitation light, and the temperature of the nonlinear optical medium so as to bring the ratio of the intensities detected by the first and second photodetectors to a preset value.

The optical demultiplexer preferably has a wavelength division multiplexing (WDM) filter that, besides separating and outputting the auxiliary signal light component and the auxiliary idler light component, separates and outputs the signal light component and the idler light component, and outputs the auxiliary signal light component, the auxiliary idler light component, the signal light component, and the idler light component on separate light paths.

An arrayed waveguide grating (AWG) filter may be used as the wavelength division multiplexing filter.

Optical low-pass filters may also be inserted into the light paths leading to the first and second photodetectors to remove light components having substantially half the wavelength of the signal light and idler light.

The device may also include a polarization splitting-combining module having first to third input/output ports and an optical loop formed by interconnecting the second and third input/output ports. The nonlinear optical medium and a 90° polarization rotator are inserted into the optical loop. The excitation light and auxiliary signal light are input through the first input/output port of the polarization splitting-combining module. The auxiliary signal light component, auxiliary idler light component, signal light component, and idler light component are output from the first input/output port. The device can be used as a polarization entangled photon pair generating device by coupling the output light into the optical demultiplexer.

The second input/output port of the polarization splitting-combining module operates as the first optical coupler with respect to excitation light and auxiliary signal light propagating clockwise through the optical loop, and as the second optical coupler with respect to the excitation light and auxiliary signal light propagating counterclockwise through the optical loop. The third input/output port of the polarization splitting-combining module operates as the first optical coupler with respect to excitation light and auxiliary signal light propagating counterclockwise through the optical loop, and as the second optical coupler with respect to the excitation light and auxiliary signal light propagating clockwise through the optical loop. The 90° polarization rotator rotates the plane of polarization of linearly polarized light that passes through the 90° polarization rotator by 90°.

If the excitation light is supplied in dual pulsed form, as consecutive pairs of pulses, the device generates time-bin entangled quantum correlated photon pairs.

In the first novel correlated photon pair generation method, excitation light and auxiliary signal light are input simultaneously to the nonlinear optical medium and the intensities of auxiliary signal light and auxiliary idler light output from the nonlinear optical medium are detected. Control is carried out to hold the ratio between the two intensities at a preset value.

The ratio of the intensity of the auxiliary idler light to the intensity of the auxiliary signal light is the DFG conversion efficiency. Since this ratio has a linear relation to the expected value of the correlated photon pair generation probability, continued stable generation of correlated photon pairs at a fixed expected rate is possible by continuous control that holds the ratio equal to the preset value.

If the intensity of the auxiliary signal light output from the nonlinear optical medium is held in a guaranteed stable state by means such as modularization of the device, continued stable generation of correlated photon pairs at a fixed expected rate is possible by detecting only the intensity of the auxiliary idler light and holding the intensity of the auxiliary idler light at a preset value. In this case the second novel correlated photon pair generation method may be used.

In the novel correlated photon pair generating device, as stated above, a control signal for making the ratio of the intensity of the auxiliary signal light component detected by the first photodetector and the intensity of the auxiliary idler light component detected by the second photodetector equal to a preset value is generated by the control signal generator. Alternatively, a control signal for holding the intensity of the auxiliary idler light component detected by the second photodetector at a preset value is generated.

Accordingly, since the control system of the novel correlated photon pair generating device is configured to keep the ratio of the intensity of the auxiliary idler light component to the intensity of the auxiliary signal light component equal to a preset value, or to keep the intensity of the auxiliary idler light component at a preset value, continued stable generation of correlated photon pairs at a fixed expected rate is possible.

BRIEF DESCRIPTION OF THE DRAWINGS

In the attached drawings:

FIG. 5 illustrates one scheme for selecting the wavelengths of the entangled photon pairs, the auxiliary signal light and the auxiliary idler light;

FIG. 6 illustrates another scheme for selecting the wavelengths of the entangled photon pairs, the auxiliary signal light, and the auxiliary idler light;

DETAILED DESCRIPTION OF THE INVENTION

Figure 7:
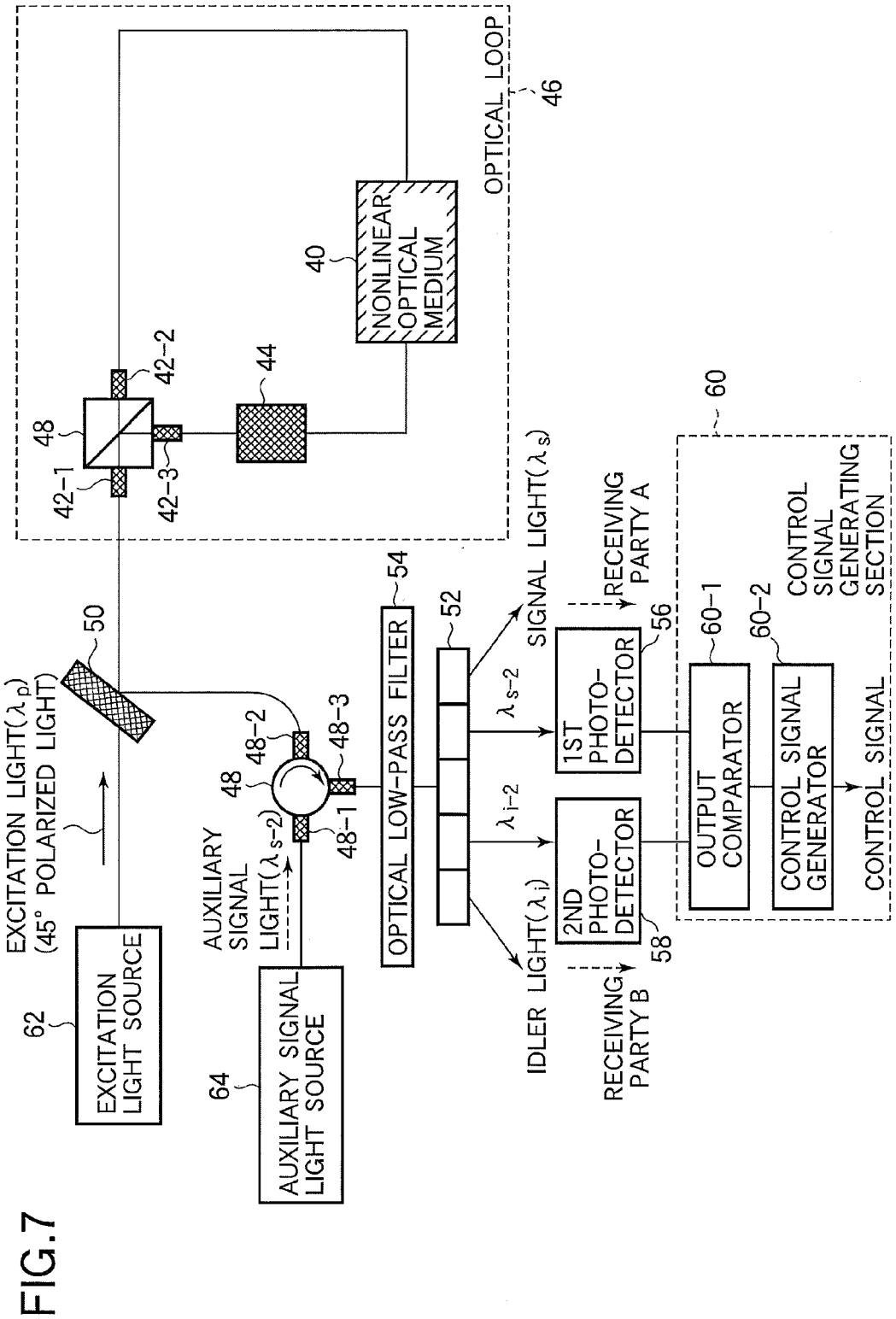
FIG. 7 is a block diagram schematically showing the structure of a quantum correlated photon pair generating device in a first embodiment of the invention.
Figure 8:
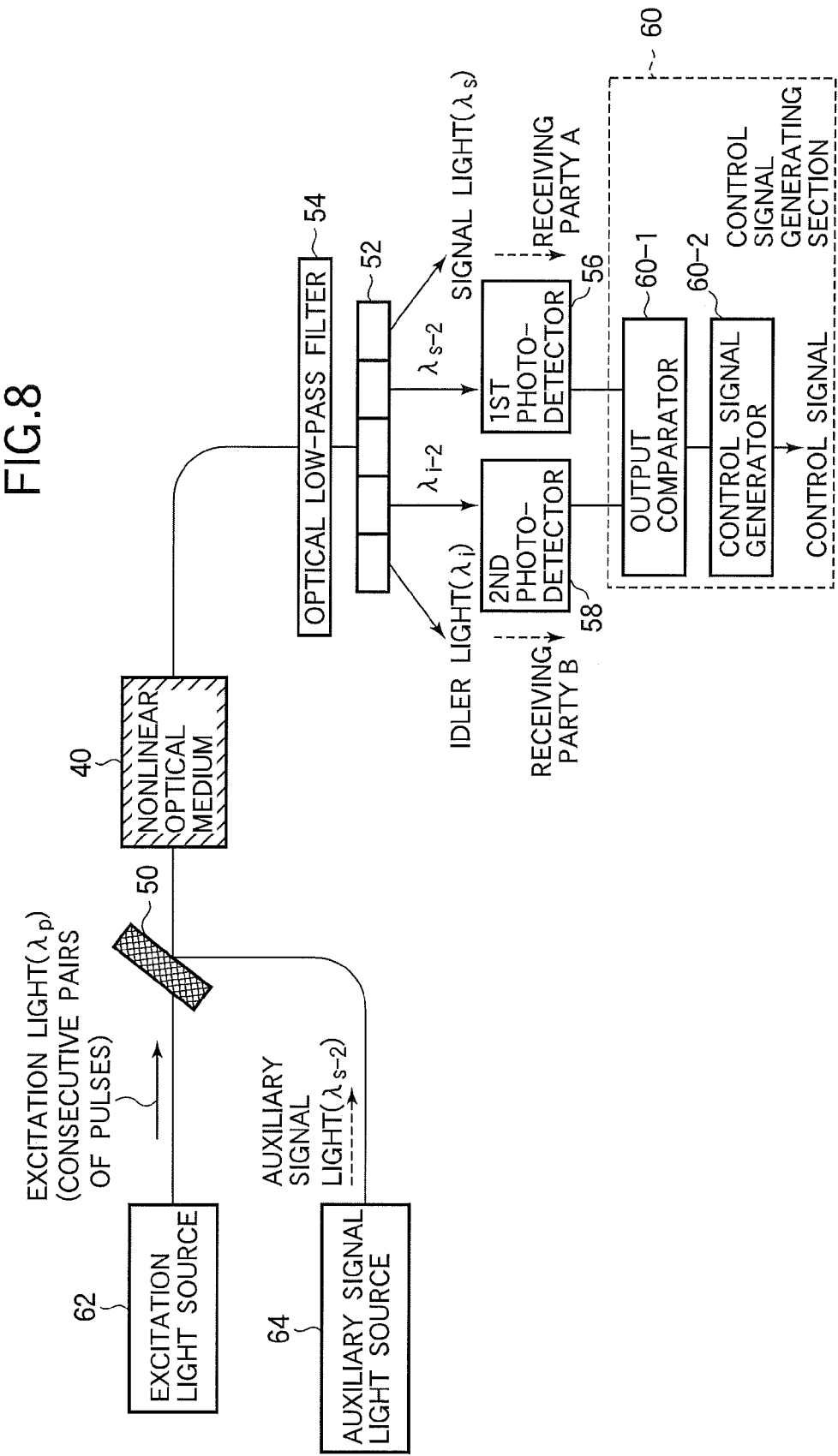
FIG. 8 is a block diagram schematically showing the structure of a quantum correlated photon pair generating device in a second embodiment of the invention.

Embodiments of the invention will now be described with reference to FIGS. 2 to 8, in which like elements are indicated by like reference characters. It will be appreciated that the particular devices and operating conditions mentioned in the following description are exemplary and do not limit the scope of the invention. The block diagrams in FIGS. 7 and 8 are likewise exemplary and non-limiting, and show the positional relationships of the component elements only schematically.

Basic Structure and Principle of Operation of the Quantum Correlated Photon Pair Generating Device The basic structure and principle of operation of a novel quantum correlated photon pair generating device will be described with reference to FIG. 2. The novel quantum correlated photon pair generating device includes a nonlinear optical medium 20, an excitation light source 12 that outputs excitation light, an auxiliary signal light source 14 that outputs auxiliary signal light, an optical combiner 16 that combines and outputs the excitation light and the auxiliary signal light, a first optical coupler 18 that couples the combined light output from the optical combiner 16 into the nonlinear optical medium 20, an optical demultiplexer 22 that separates at least an auxiliary signal light component and an auxiliary idler light component from the output light output from the nonlinear optical medium 20, a first photodetector 24 that detects the intensity of the auxiliary signal light component, a second photodetector 26 that detects the intensity of the auxiliary idler light component, and a control signal generating section 30.

The excitation light source 12 outputs excitation light of wavelength $\lambda_p$, wavenumber $k_p$, and angular oscillation frequency $\omega_p$; the auxiliary signal light source 14 outputs auxiliary signal light of wavelength $\lambda_{s\text{-}2}$, wavenumber $k_{s\text{-}2}$, and angular oscillation frequency $\omega_{s\text{-}2}$. Input of the excitation light to the nonlinear optical medium 20 causes spontaneous parametric fluorescence, which generates quantum correlated photon pairs, each pair consisting of a signal photon of wavelength $\lambda_s$, wavenumber $k_s$, and angular oscillation frequency $\omega_s$ and an idler photon of wavelength $\lambda_i$, wavenumber $k_i$, and angular oscillation frequency $\omega_i$. Input of the auxiliary signal light in combination with the excitation light causes stimulated parametric conversion, which generates auxiliary idler light of wavelength $\lambda_{i\text{-}2}$, wavenumber $k_{i\text{-}2}$, and angular oscillation frequency $\omega_{i\text{-}2}$.

When input of the excitation light to the nonlinear optical medium 20 causes it to generate quantum correlated photon pairs by spontaneous parametric fluorescence, the wavelength $\lambda_p$, wavenumber $k_p$, and angular oscillation frequency $\omega_p$ of the excitation light, the wavelength $\lambda_s$, wavenumber $k_s$, and angular oscillation frequency $\omega_s$ of the signal photons, and the wavelength $\lambda_i$, wavenumber $k_i$, and angular oscillation frequency $\omega_i$ of the idler photons satisfy relations equivalent to the laws of conservation of momentum and energy. If only these correlated photon pairs were to be used, a quantum correlated photon pair generating device having in effect a conventional structure would be formed.

However, auxiliary signal light is input to the nonlinear optical medium 20 together with the excitation light. This causes auxiliary idler light to be generated by DFG. In effect some of the auxiliary signal light is converted to auxiliary idler light. The wavelength $\lambda_p$, wavenumber $k_p$, and angular oscillation frequency $\omega_p$ of the excitation light, the wavelength $\lambda_{s\text{-}2}$, wavenumber $k_{s\text{-}2}$, and angular oscillation frequency $\omega_{s\text{-}2}$ of the auxiliary signal light, and the wavelength $\lambda_{i\text{-}2}$, wavenumber $k_{i\text{-}2}$, and angular oscillation frequency $\omega_{i\text{-}2}$ of the auxiliary idler light also satisfy relations equivalent to the laws of conservation of momentum and energy.

When a second-order nonlinear optical medium is used, the wavenumbers and angular frequencies of the auxiliary signal light and auxiliary idler light satisfy the following equations (5) and (6).

$$k = k_{s\text{-}2} + k_{i\text{-}2} + K \quad (5)$$

$$\omega_p = \omega_{s\text{-}2} + \omega_{i\text{-}2} \quad (6)$$

When a third-order nonlinear optical medium is used, the following equations (7) and (8) are satisfied.

$$2k = k_{s\text{-}2} + k_{i\text{-}2} + K \quad (7)$$

$$2\omega_p = \omega_{s\text{-}2} + \omega_{i\text{-}2} \quad (8)$$

The quantity K in equations (5) and (7) is a parameter corresponding to the period of the periodically modulated structure of the nonlinear optical medium 20.

The simultaneous input of excitation light of wavelength $\lambda_p$, wavenumber $k_p$, and angular oscillation frequency $\omega_p$ and auxiliary signal light of wavelength $\lambda_{s\text{-}2}$, wavenumber $k_{s\text{-}2}$, and angular oscillation frequency $\omega_{s\text{-}2}$ to the nonlinear optical medium 20 constitutes the first step of the novel correlated photon pair generation methods.

The auxiliary signal light component output from the nonlinear optical medium 20 is detected by the first photodetector 24 and the auxiliary idler light component is detected by the second photodetector 26. The auxiliary signal light intensity signal and auxiliary idler light intensity signal produced by the first and second photodetectors 24, 26 are input to the control signal generating section 30. The control signal generating section 30 includes an output comparator 30-1 and a control signal generator 30-2.

Figure 1:
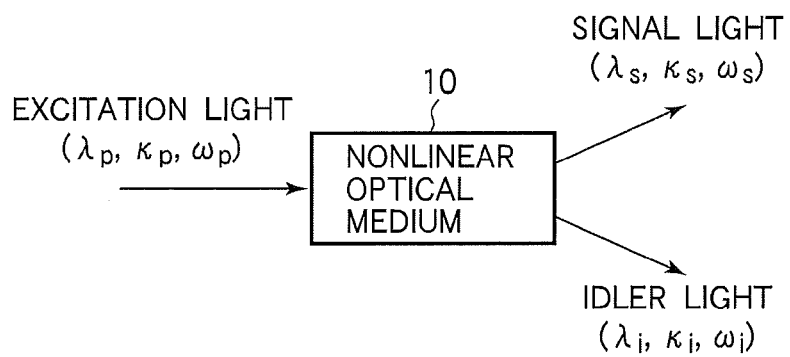
FIG. 1 schematically illustrates a spontaneous parametric fluorescence process in a second-order or third-order nonlinear optical medium.
Figure 2:
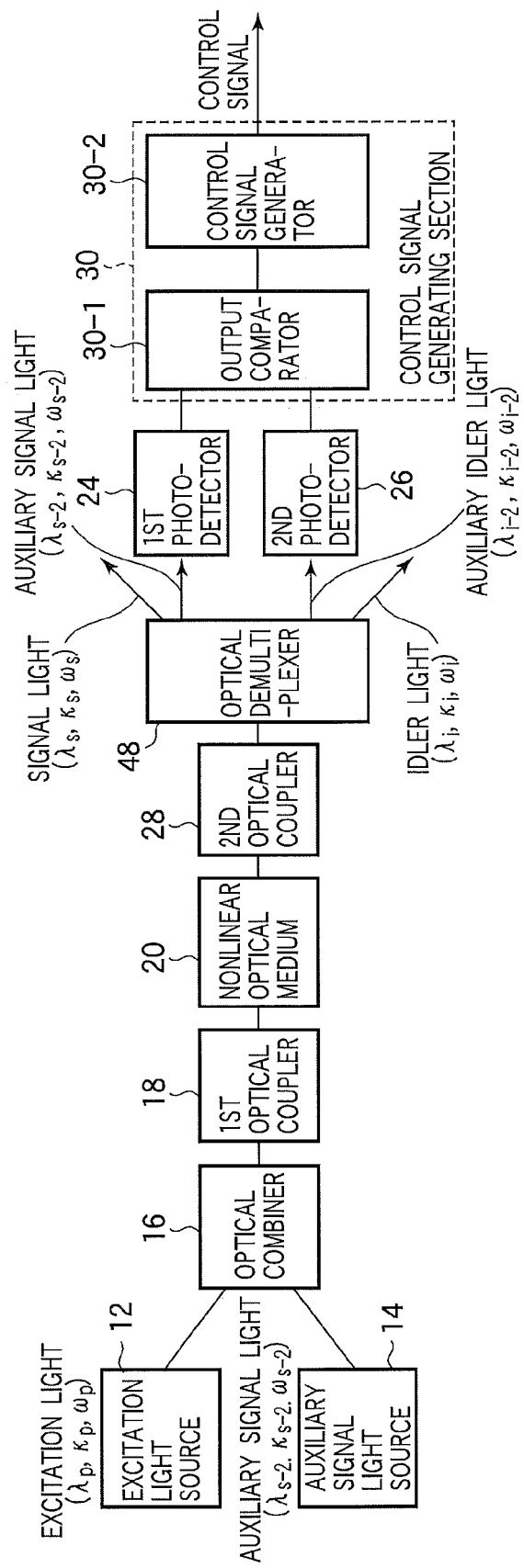
FIG. 2 illustrates the basic structure and operation of a quantum entangled photon pair generating device embodying the invention.

Although the output comparator 30-1 and control signal generator 30-2 are shown as separate functional blocks in FIG. 2, when the quantum correlated photon pair generating device is manufactured, they may be combined into a single unit. This also applies to the output comparator 60-1 and control signal generator 60-2 in FIGS. 7 and 8.

The auxiliary signal light intensity signal and auxiliary idler light intensity signal are input to the output comparator 30-1. A signal proportional to the ratio between the auxiliary signal light intensity and auxiliary idler light intensity is output from the output comparator 30-1 and input to the control signal generator 30-2.

If the intensity of the auxiliary signal light output from the auxiliary signal light source 14 is stable and the optical coupling system including optical couplers 16, 18 and other coupling elements is stabilized, e.g., if the optical coupling system is modularized, the intensity of the auxiliary signal light output from the nonlinear optical medium 20 will also be stable. In that case, the first photodetector 24 is not strictly necessary; since the signal output from the first photodetector 24 has a constant level, it can be replaced with an electrical signal having a fixed value. It is always possible, however, that the intensity of the auxiliary signal light output from the nonlinear optical medium 20 may fluctuate for some reason, so it is generally preferable to use the first photodetector 24 to detect the intensity of the auxiliary signal light output from the nonlinear optical medium 20 and generate the control signal on the basis of the ratio of the intensities of the auxiliary signal light component and the idler light component.

The second step in the first novel correlated photon pair generation method is a step in which the intensities of the auxiliary signal light and auxiliary idler light output from the nonlinear optical medium 20 are detected by the first and second phototransistors 24, 26 and at least one of the intensity of the excitation light, the wavelength of the excitation light, and the temperature of the nonlinear optical medium is controlled to hold the ratio between the two detected intensities equal to a preset value. The second step in the second novel correlated photon pair generation method is a step in which at least one of the intensity of the excitation light, the wavelength of the excitation light, and the temperature of the nonlinear optical medium is controlled to hold the intensity of the auxiliary idler light detected by the second photodetector 26 equal to a preset value. Further details will be described later.

Experimental Verification of the Operation of the Quantum Correlated Photon Pair Generating Device Experiments to verify the operation of the quantum correlated photon pair generating device were carried out, using a PPLN waveguide device. The PPLN waveguide device was fabricated by creating a periodic polarization reversal structure in a LiNbO$_3$ substrate having a MgO-doped stoichiometric composition, and then machining a ridge optical waveguide structure by proton exchange and dicing. The length of the device was 6 cm, and the ridge width was about 10 micrometers. The polarization reversal period Λ was about 19.3 micrometers. This value of Λ was determined so that the excitation wavelength $\lambda_p$ (referred to as the quasi phase matching wavelength or QPM wavelength) at which the PPLN device would output the maximum amount of light due to second harmonic generation (SHG) would be 1562.75 nm. It will be appreciated that the length of the PPLN device and the values of Λ and other parameters are design choices and do not limit the invention. The propagation loss of the fabricated PPLN device in the 1550-nm band was approximately 0.1 dB/cm.

The experiments were carried out using a PPLN module fabricated by optically integrating this PPLN waveguide device with a temperature control element (Peltier cooler), a coupling lens, and optical input/output fibers. The optical insertion loss of the module in the 1550-nm band was approximately 3.8 dB.

(1) First SPDC Process

First, excitation light having a wavelength of 781.375 nm, half the QPM wavelength 1562.75 nm of the PPLN module, was input and the optical spectrum of the light output from the PPLN module was measured. This measurement measured the optical spectrum of correlated photon pairs generated by a direct SPDC process (single-stage SPDC) satisfying the conditions given by equations (1) and (2). An optical spectrum analyzer set to a wavelength resolution of 5 nm was used in the measurement. The intensity of the light input to the PPLN module was measured at a point just before the light entered the PPLN module, and was regulated to a value of +15 dBm.

The verification experiments will now be described with reference to FIGS. 3A to 3C, which show experimentally determined relationships between the intensity of the output light generated by the SPDC process and the DFG conversion efficiency.

Figure 3A:
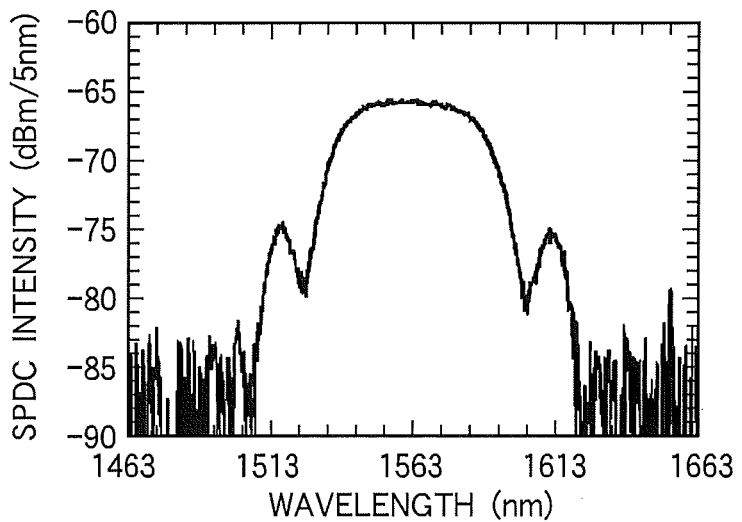
FIG. 3A shows an experimentally derived spectrum of light obtained by SPDC under conditions satisfying a quasi phase matching condition.

FIG. 3A shows the optical spectrum of SPDC light generated under conditions satisfying the QPM condition. An optical spectrum spreading symmetrically from the QPM wavelength (1562.75 nm) in the center was observed. This distribution is the spectral distribution of correlated photon pairs generated by the SPDC process, and shows that correlated photon pairs with various combinations of wavelengths satisfying the above condition (2) were being generated. The observed SPDC spectral intensity was interpreted as being proportional to the probability of generation of correlated photon pairs at each combination of wavelengths.

The SPDC spectrum was also observed while the intensity of the excitation light was varied, and while the wavelength of the excitation light was varied. In addition the intensity of the SPDC light at a wavelength offset by +10 nm from the wavelength of the excitation light was measured. This was equivalent to measuring the probability of generation, or the expected generation rate, of correlated photon pairs at a wavelength offset by +10 nm under each set of conditions.

Next, the excitation light and auxiliary signal light were input simultaneously to the PPLN module, and the optical spectrum of the light output from the PPLN module was measured. For each measurement, the wavelength of the auxiliary signal light was adjusted so that it was offset by +10 nm from the wavelength of the excitation light. From the observed spectra, the intensity of the output auxiliary signal light and the output intensity of auxiliary idler light occurring at an angular oscillation frequency satisfying equation (6) were measured, and the intensity ratio (auxiliary idler light intensity/auxiliary signal light intensity) was defined as the DFG wavelength conversion efficiency.

As in the preceding measurement, the wavelength conversion efficiency was measured at various intensities and wavelengths of excitation light. FIGS. 3B and 3C were obtained by plotting the relationship between SPDC light intensity and DFG wavelength conversion efficiency from the experimental data.

Figure 3B:
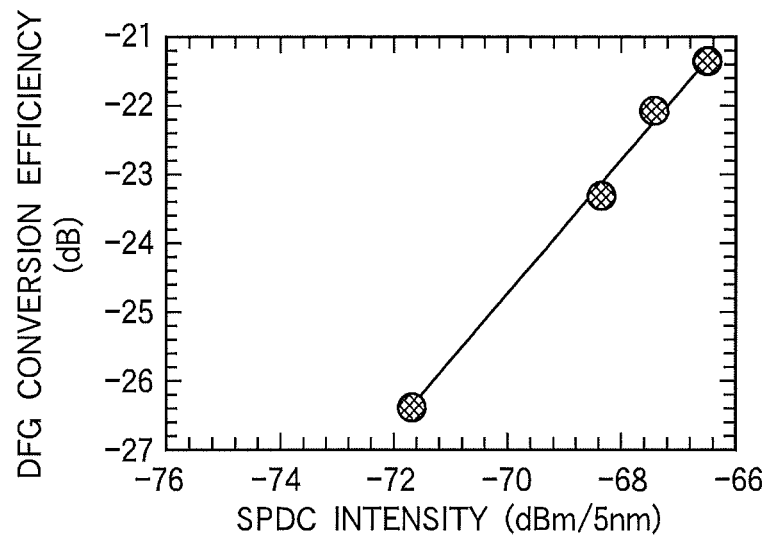
FIG. 3B is a graph of experimental data showing the relation between DFG conversion efficiency and SPDC output intensity as the intensity of the excitation light was varied.

FIG. 3B shows the relationship between SPDC light intensity and DFG wavelength conversion efficiency measured when the wavelength of the excitation light was fixed at 781.375 nm (half the QPM wavelength of 1562.75 nm), thereby satisfying the QPM condition, and the intensity of the excitation light was varied. FIG. 3C shows the relationship between SPDC light intensity and DFG wavelength conversion efficiency measured when the intensity of the excitation light was fixed at +15 dBm and the wavelength of the excitation light was varied. The results in FIG. 3C were thus obtained under conditions in which the excitation light, signal light, and idler light did not strictly satisfy the quasi phase matching condition given by equation (1).

Figure 3C:
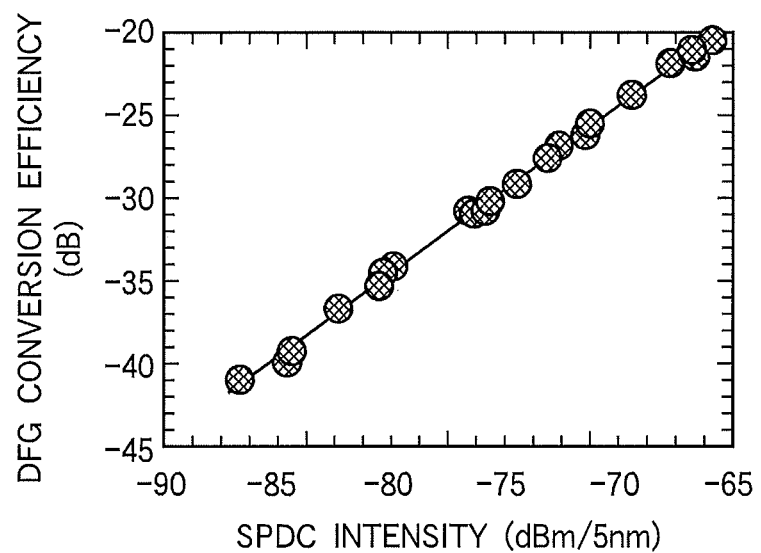
FIG. 3C is a graph of experimental data showing the relation between DFG conversion efficiency and SPDC output intensity as the wavelength of the excitation light was varied.

The results shown in FIGS. 3B and 3C demonstrated a linear relationship between SPDC light intensity and DFG wavelength conversion efficiency. If x is the SPDC light intensity and y is the DFG wavelength conversion efficiency, the linear relation in FIG. 3B is approximately $$y=0.98217x+44.033$$

and the linear relation in FIG. 3C is approximately $$y=1.0055x+45.742.$$

The slopes of the two lines (0.98217 and 1.0055) are nearly equal, indicating the presence of a constant of proportionality that is the same under the measurement conditions in both FIGS. 3B and 3C. The relationships shown in FIGS. 3B and 3C are proportional in the sense that a given change in x produces a proportional change in y. The term 'proportional' will be used in this sense below.

The results in FIGS. 3B and 3C thus show that there is a linear or proportional relation between the expected probability of generation of correlated photon pairs and the DFG wavelength conversion efficiency, and that the constant of proportionality does not depend on phase matching.

(2) Cascaded SHG/SPDC Process

Studies of a cascaded SHG/SPDC process by which correlated photon pairs are generated by the occurrence of both SHG and SPDC in the same second-order nonlinear optical medium were reported by the present inventor in Arahira et. al., 'PPLN rijji doharo debaisu wo mochiita kasukedo $\chi^{(2)}$ hoshiki ni yoru parametrikku kahohenkanko hassei' (Generation of parametric down-converted light by cascaded $\chi^{(2)}$ method using PPLN ridge waveguide device), 21st Quantum Information Technology Symposium, Technical Committee on Quantum Information Technology, IEICE of Japan, pp. 184-187, 2009. In the method reported in this paper, when excitation light was supplied to a PPLN device, first SHG occurred in the PPLN device, and then the SHG light became seed light for an SPDC process that generated correlated photon pairs. This cascaded SHG/SPDC process can be regarded as simulating a third-order nonlinear optical effect, and the wavenumbers and optical angular frequencies of the input excitation light and the generated photon pairs (signal light and idler light) satisfy the relations given by equations (3) and (4).

The existence of a generally equivalent cascaded SHG/DFG process, in which SHG is followed by DFG instead of SPDC, is well known in the research community; in fact, the SHG/DFG process has been studied thoroughly more than the cascaded SHG/SPDC process. If auxiliary signal light and excitation light are input simultaneously to a nonlinear optical medium to give rise to cascaded SHG/DFG, auxiliary idler light having an angular oscillation frequency satisfying equation (8) is generated.

Next, using the same PPLN device as used to obtain the experimental data in FIGS. 3A to 3C, experiments were carried out on the generation of correlated photon pairs by the cascaded SHG/SPDC and cascaded SHG/DFG methods. In one experiment, the intensity and wavelength of the excitation light were varied and the intensity of the SPDC light generated by cascaded SHG/SPDC was measured. The wavelength of the input excitation light was a wavelength in the vicinity of the QPM wavelength of 1532.75 nm. In a following experiment, excitation light and auxiliary signal light were input simultaneously to the nonlinear optical medium and the wavelength conversion efficiency of the cascaded SHG/DFG method was measured.

In the cascaded SHG/SPDC experiment, as in the experiment to verify the generation of correlated photon pairs by the SPDC process described above, the intensity and wavelength of the excitation light were varied, and the SPDC spectrum was measured. The intensity of the SPDC light at a wavelength offset by +10 nm from the wavelength of the excitation light was also measured. In the cascaded SHG/DFG experiment, the same excitation light was input together with auxiliary light, and the wavelength conversion efficiency by DFG was measured as the intensity and wavelength of the excitation light were varied.

Figure 4A:
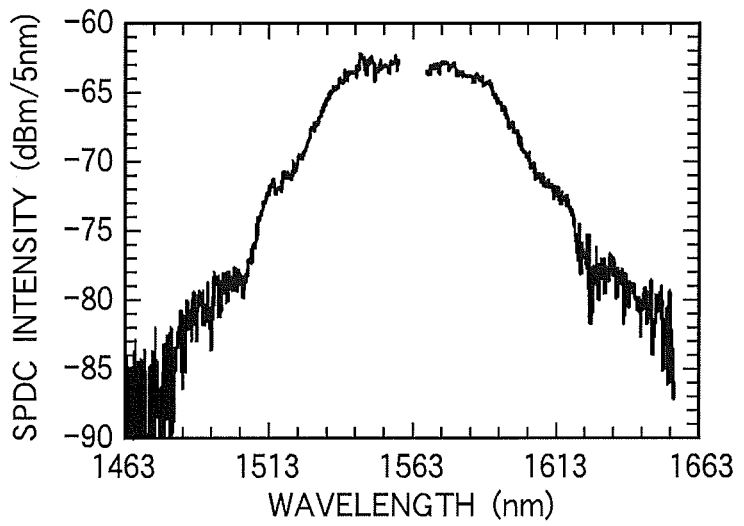
FIG. 4A shows an experimentally derived spectrum of light obtained by cascaded SHG/SPDC under conditions satisfying the quasi phase matching condition.
Figure 4B:
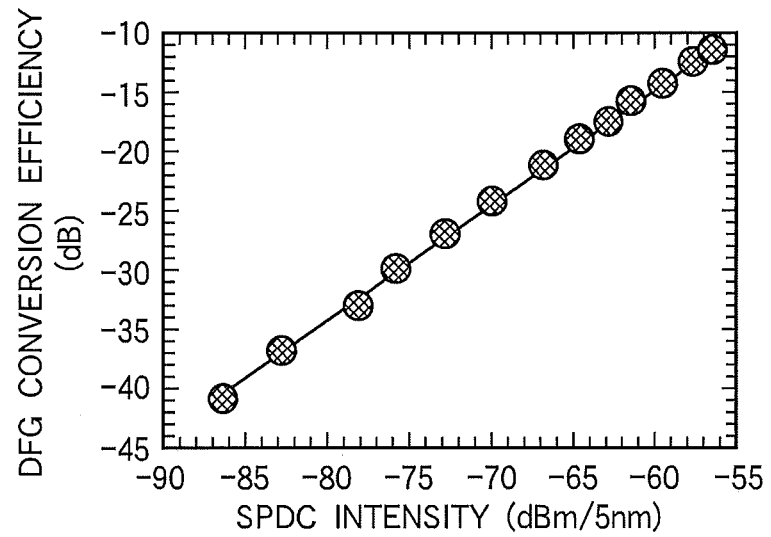
FIG. 4B is a graph of experimental data showing the relation between cascaded SHG/DFG conversion efficiency and cascaded SHG/SPDC output intensity as the intensity of the excitation light was varied.
Figure 4C:
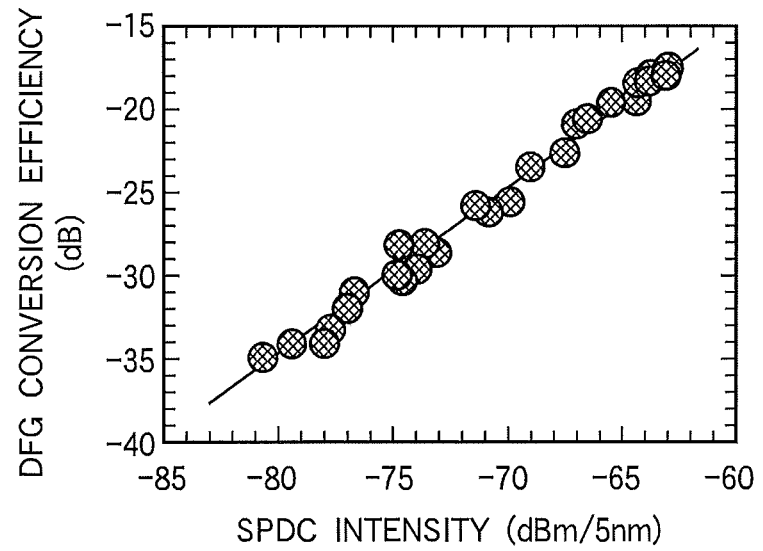
FIG. 4C is a graph of experimental data showing the relation between cascaded SHG/DFG conversion efficiency and cascaded SHG/SPDC output intensity as the wavelength of the excitation light was varied.

The results of the experiments on the generation of correlated photon pairs by cascaded SHG/SPDC and cascaded SHG/DFG will now be described with reference to FIGS. 4A to 4C. These graphs show the experimentally determined relationships between the intensity of the output light generated by the SPDC process and the DFG conversion efficiency. FIG. 4A shows the optical spectrum of SHG/SPDC light generated under conditions satisfying the QPM condition, when the excitation light had the QPM wavelength (1562.75 nm). FIG. 4B shows the relationship between SHG/SPDC light intensity and SHG/DFG wavelength conversion efficiency measured when the wavelength of the excitation light was fixed at the QPM wavelength (1562.75 nm) and the intensity of the excitation light was varied. FIG. 4C shows the relationship between SHG/SPDC light intensity and SHG/DFG wavelength conversion efficiency measured when the intensity of the excitation light was fixed at +15 dBm and the wavelength of the excitation light was varied.

The results shown in FIGS. 4B and 4C demonstrated a linear relationship between cascaded SHG/SPDC light output intensity and cascaded SHG/DFG wavelength conversion efficiency. If x is the SPDC light intensity and y is the DFG wavelength conversion efficiency, the linear relation in FIG. 4B is approximately $$y=0.97976x+44.284$$

and the linear relation in FIG. 4C is approximately $$y=0.99326x+44.839.$$

The slopes of the two lines (0.97976 and 0.99326) are nearly equal, indicating that the constant of proportionality is the same under the measurement conditions in both FIGS. 4B and 4C.

The results in FIGS. 4B and 4C thus show that there is a linear or proportional relation between the expected probability of generation of correlated photon pairs and the DFG wavelength conversion efficiency, and that the constant of proportionality does not depend on phase matching.

The experiments described above were repeated with different PPLN devices and different waveguide structures. The results showed that the linear or proportional relation between the expected probability of generation of correlated photon pairs and the DFG wavelength conversion efficiency and the constant of proportionality in the relation did not depend on the length or waveguide structure of the PPLN device.

The verification experiments described above accordingly led to the following findings (A) and (B).

(A) There is a linear or proportional relation between the expected probability of generation of correlated photon pairs and the DFG wavelength conversion efficiency. This relation holds both for the ordinary SPDC process and for the cascaded SHG/SPDC process. It can be inferred that a linear or proportional relation also exists between the SFWM process that generates quantum correlated photon pairs and the wavelength conversion efficiency of the SFWM process that generates auxiliary idler light in a third-order nonlinear optical medium.

(B) The above linear or proportional relations do not depend on whether or not a phase matching condition (including quasi phase matching) is strictly satisfied or not, or on parameters that determine the length, waveguide structure, etc. of the PPLN device or other device that generates the correlated photon pairs. Accordingly, when correlated photon pairs are generated by nonlinear optical media of the same composition, the constant of proportionality will take the same value.

Design Guidelines for the Wavelengths of the Excitation Light, Auxiliary Signal Light, and Auxiliary Idler Light The findings from the verification experiments described above showed that from the wavelength conversion efficiency of auxiliary idler light it should be possible to determine the expected probability or rate of generation of correlated photon pairs by the SPDC process or SFWM process. Since the SPDC (or SFWM) process and the DFG (or SFWM) process are basically independent processes that occur without one being subordinate to the other, measurement of the wavelength conversion efficiency of the auxiliary idler light, if carried out by an appropriate detection method described below, does not disturb the quantum states of the correlated photon pairs.

If the wavelengths $\lambda_s$, $\lambda_i$ of the correlated photon pairs to be generated are too close to the wavelengths $\lambda_{s-2}$, $\lambda_{i-2}$ of the auxiliary signal light and auxiliary idler light to be monitored, however, when the auxiliary signal light and auxiliary idler light are detected, it is possible that correlated photons will also be detected and their quantum states will be affected. The wavelengths must accordingly be well separated.

How the wavelengths of the correlated photon pairs and the wavelengths of the auxiliary signal light and auxiliary idler light should be selected so as to satisfy the necessary separation condition will be described with reference to FIG. 5. FIG. 5 illustrates relations between the SPDC spectrum and the transmission curve of the optical filter that extracts the idler light, the transmission curve of the optical filter that extracts the signal light, the QPM band (or SHG band), the wavelength of the auxiliary signal light, and the wavelength of the auxiliary idler light. Wavelength is indicated on the horizontal axis in arbitrary units. The QPM band is the range of wavelengths of the excitation light, centered on the QPM wavelength, in which SPDC light and DFG light are generated with useful intensities.

The wavelengths of the correlated photon pairs, the auxiliary signal light, and the auxiliary idler light should be selected in relation to each other as shown in FIG. 5. The range of wavelengths in which correlated photon pairs can be generated is confined to a limited band. This is because the wavelength band in which the phase matching conditions given by equations (1) and (3) can be satisfied is limited by the effect of the refractive index dispersion characteristics of the nonlinear optical medium. To obtain maximum conversion efficiency, the combination of wavelengths of the correlated photon pairs ($\lambda_s$, $\lambda_i$) should be selected within the wavelength range that enables pair generation, as shown in FIG. 5.

If wavelengths at a distance from the above combination ($\lambda_s$, $\lambda_i$) are chosen as the combination of wavelengths of the auxiliary signal light and auxiliary idler light ($\lambda_{s-2}$, $\lambda_{i-2}$), then any wavelengths in the wavelength range in which the generation of correlated photon pairs is possible can be chosen as the combination of wavelengths of the correlated photon pairs. It then becomes possible to select a plurality of combinations of wavelengths for the correlated photon pairs simultaneously, thereby widening the range of applicability of the invention.

When a plurality of combinations of wavelengths for the correlated photon pairs are selected simultaneously, the intensity of the auxiliary idler light is reduced, but if necessary the input intensity of the auxiliary signal light can be increased to raise the intensity of the auxiliary idler light to a level high enough for adequate detection by an ordinary photodetector. To detect the intensity of the auxiliary idler light component, accordingly, a high-sensitivity, low-noise photodetector is not as necessary as when single photons are detected.

In another preferred mode of use of the novel correlated photon pair generating device, the wavelengths ($\lambda_s$, $\lambda_i$) of the auxiliary signal light and auxiliary idler light are placed near the wavelength of the excitation light, as shown in FIG. 6. Like FIG. 5, FIG. 6 illustrates relations between the SPDC spectrum and the transmission curve of the optical filter that extracts the idler light, the transmission curve of the optical filter that extracts the signal light, the QPM band (or SHG band), the wavelength of the auxiliary signal light, and the wavelength of the auxiliary idler light.

When correlated photon pairs are generated by the SFWM process or the cascaded SHG/SPDC process, the light output from the nonlinear optical medium includes a strong excitation light component which must ultimately be removed. The excitation light component is removed by optical bandpass filters or similar devices that also remove combinations of wavelengths positioned near the wavelength of the excitation light.

If the wavelengths of the auxiliary signal light and auxiliary idler light are placed within the range of wavelengths removed by the optical bandpass filters, then a plurality of combinations of wavelengths for the correlated photon pairs can be selected simultaneously, with substantially no restrictions on the combinations selected, thereby widening the range of applicability of the invention.

It then becomes necessary, however, to ensure that mixing of the excitation light and the auxiliary signal light does not produce any nonlinear optical effects. In particular, when a third-order nonlinear optical medium is used, it is necessary to ensure that mixing of one photon of excitation light with one photon of auxiliary signal light, one photon of signal light, and one photon of idler light does not produce spontaneous four-wave mixing. When a second-order nonlinear optical medium is used, it is necessary to ensure that the auxiliary signal light does not itself give rise to an SPDC process, and that short-wavelength photons produced by frequency summation of the excitation light and auxiliary signal light do not give rise to an SPDC process (a cascaded sum-frequency-generation/SPDC process). If these processes are allowed to occur, the probability of generation of uncorrelated photon pairs increases, reducing the purity of the output of correlated photon pairs from the correlated photon pair generating device.

To avoid the occurrence of an SPDC process due to the auxiliary signal light itself or an SPDC process due to short-wavelength photons created from the excitation light and auxiliary signal light by sum frequency generation, when a second-order nonlinear optical medium is used, for example, the wavelength of the auxiliary signal light must be adequately separated from the SHG band.

If the auxiliary signal light and auxiliary idler light are produced in wavelength regions satisfying the conditions above, a correlated photon pair generating device of the type shown in FIG. 2 can be realized.

Operation of the Quantum Correlated Photon Pair Generating Device

The operation of a novel correlated photon pair generating device using a second-order nonlinear optical medium will be described below, but it will be appreciated that the same description applies to a correlated photon pair generating device using a third-order nonlinear optical medium, with replacement of SPDC and DFG, where these terms occur in the description, by SFWM.

The operation starts with the output from the excitation light source 12 of excitation light for pumping the SPDC process that leads to the production of correlated photon pairs, and the output from the auxiliary signal light source 14 of auxiliary signal light that, in combination with the excitation light, leads to the production of auxiliary idler light by DFG. The excitation light and auxiliary signal light are combined and input simultaneously to the nonlinear optical medium 20, which in this case is a second order nonlinear optical medium and will be referred to as such below.

The first optical coupler 18 in FIG. 2 is an optical system including lenses or other elements for inserting the combined excitation light and auxiliary signal light received from the optical combiner 16 simultaneously into the second order nonlinear optical medium 20. The first optical coupler 18 can be configured by use of optical waveguides or wavelength multiplexing filters.

The light output from the second-order nonlinear optical medium 20 includes excitation light, signal light, idler light, auxiliary signal light, and auxiliary idler light, the signal light and idler light being output as correlated photon pairs. From this mixture of light, the optical demultiplexer 22 extracts the wavelength component of the auxiliary signal light and, separately, the wavelength component of the auxiliary idler light. The optical demultiplexer 22 also extracts the wavelength components of the signal light and idler light, which are the wavelength components of the correlated photon pairs. The optical demultiplexer 22 can be implemented as, for example, an arrayed waveguide (AWG) filter.

The intensities of the extracted auxiliary signal light and the extracted auxiliary idler light are detected by the first and second photodetectors 24, 26. The intensity signals output from the first and second photodetectors 24, 26 are input to the output comparator 30-1, which outputs an intensity ratio signal giving the ratio of the detected intensities. The control signal generator 30-2 receives the intensity ratio signal and generates one or more control signals that control at least one of the wavelength of the excitation light, the intensity of the excitation light, and the temperature of the nonlinear optical medium so as to bring the ratio of the two intensities, as indicated by the intensity ratio signal, to a preset value. The means by which the wavelength and intensity of the excitation light and the temperature of the nonlinear optical medium are controlled are omitted from FIG. 2.

Since the intensity ratio is the ratio between the auxiliary signal light intensity and the auxiliary idler light intensity, it is equal to the DFG wavelength conversion efficiency. As already described, the expected probability of generation of correlated photon pairs is linearly related to that intensity ratio.

Accordingly, the expected probability of generation of correlated photon pairs can be maintained at a stable desired value by keeping the intensity ratio signal output from the output comparator 30-1 at a preset value.

One way of keeping the intensity ratio signal output from the output comparator 30-1 at a preset value is to have the control signal generator 30-2 output a control signal responsive to the amount of deviation of the intensity ratio signal from the preset value, and to use this control signal to control the output intensity of the excitation light source 12. This method can be implemented by a well-known feedback control scheme based on the intensity ratio signal.

Alternatively, as described later, the control signal may be used to control the offset of the output wavelength of the excitation light source 12 from the phase matching condition.

In ordinary non-cascaded DFG, the DFG conversion efficiency, and therefore the expected probability of generation of correlated photon pairs, is proportional to the intensity of the excitation light. The above control scheme can therefore be carried out by adjusting the intensity of the excitation light.

In cascaded SHG/DFG, the DFG conversion efficiency is proportional to the square of the intensity of the excitation light, so the above control scheme can again be carried out by adjusting the intensity of the excitation light.

The efficiency with which the second-order nonlinear optical medium 20 produces a nonlinear optical effect depends on temperature, so the above control scheme can also be carried out by controlling the temperature of the second-order nonlinear optical medium 20 according to the control signal.

Similarly, if the wavelength of the excitation light deviates from the phase matching condition, it deviates from the phase matching conditions given by equations (1), (3), and (5) because of refractive dispersion of the second-order nonlinear optical medium 20, so the DFG conversion efficiency depends on the wavelength of the excitation light. In addition, if the temperature of the second-order nonlinear optical medium 20 is varied, the phase matching condition changes because of the temperature dependence of the refractive index, and the DFG conversion efficiency varies. These relations are used when the expected probability of generation of correlated photon pairs is controlled by control of the temperature of the second-order nonlinear optical medium 20.

The Quantum Correlated Photon Pair Generating Device in the First Embodiment

The quantum correlated photon pair generating device and its operation in the first embodiment will now be described with reference to FIG. 7. The quantum correlated photon pair generating device in the first embodiment incorporates an optical loop 46 of the Sagnac interferometer type, including an optical splitter-combiner 42. A nonlinear optical medium 40 for generating correlated photon pairs and a 90° polarization converter 44 are disposed in the loop 46. The 90° polarization converter 44 rotates the plane of polarization of linearly polarized light that passes trough the 90° polarization converter 44 by 90°. A wavelength filter that functions as an optical demultiplexer is disposed outside the loop.

The optical loop 46 is preferably a polarization maintaining optical system. The loop is preferably configured using polarization maintaining optical fiber, but it may also be configured with free space optics using coupling lenses. If the optical loop 46 is configured as an optical module formed with couplings of ordinary optical fiber, not having a polarization maintaining function, instead of polarization maintaining optical fiber, a pseudo-polarization-maintaining optical system can still be constructed by using additional optical devices such as polarization controllers. The 90° polarization converter 44 is preferably a half-wave plate, but may also be formed by fusion splicing of optical fibers, or by other means.

The quantum correlated photon pair generating device in the first embodiment of the invention uses an optical circulator 48, a first WDM filter 50, a second WDM filter 52, and an optical low-pass filter 54 as optical input-output components for input of excitation light and auxiliary signal light to the optical loop 46 and selective extraction and output of the wavelength components of the correlated photon pairs and auxiliary signal and idler light that emerge from the optical loop 46. The excitation light is generated by an excitation light source 62; the auxiliary signal light is generated by an auxiliary signal light source 64.

Of these components of the quantum correlated photon pair generating device in FIG. 7, the optical splitter-combiner 42, optical circulator 48, and first WDM filter 50 perform the functions of the optical combiner 16 and the first and second optical couplers 18, 28 in FIG. 2. The second WDM filter 52 in FIG. 7 performs the function of the optical demultiplexer 22 in FIG. 2. The optical splitter-combiner 42 has a first input/output port 42-1, a second input/output port 42-2, and a third input/output port 42-3.

Light entering the optical splitter-combiner 42 has p-polarized and s-polarized components, the p-polarized component having an electric field vector that oscillates parallel to the plane of incidence of the light on the polarization selective reflecting surface of the optical splitter-combiner 42 indicated by the diagonal line in FIG. 7, the s-polarized component having an electric field vector that oscillates perpendicular to this incidence plane. The p-polarized component of light input to the first input/output port 42-1 is output from the second input/output port 42-2, the s-polarized component being output from the third input/output port 42-3. The p-polarized component of light input to the second input/output port 42-2 is output from the first input/output port 42-1, and the s-polarized component of light input to the third input/output port 42-3 is likewise output from the first input/output port 42-1. The optical splitter-combiner 42 also has, at least in principle, a fourth input/output port from which the s-polarized component of light input to the second input/output port 42-2 and the p-polarized component of light input to the third input/output port 42-3 are output, but the fourth input/output port is not used in the first embodiment, so it is omitted from FIG. 7.

In the first embodiment, the excitation light is input to the first input/output port 42-1 of the optical splitter-combiner 42. Because of the presence of the nonlinear optical medium 40 and 90° polarization converter 44 in the optical loop 46, an auxiliary signal light component, an auxiliary idler light component, a signal light component, and an idler light component are output from the first input/output port 42-1. The second input/output port 42-2 operates as a first optical coupler for excitation light and auxiliary signal light circulating clockwise in the optical loop 46, and as a second optical coupler for excitation light and auxiliary signal light circulating counterclockwise in the optical loop 46. The third input/output port 42-3 operates as a first optical coupler for excitation light and auxiliary signal light circulating counterclockwise in the optical loop 46, and as a second optical coupler for excitation light and auxiliary signal light circulating clockwise in the optical loop 46.

The optical splitter-combiner 42 may be selected from among the various commercially available polarizing splitter-combiners. The available types of polarizing splitter-combiners include both thin-film polarizing beam splitters and birefringent polarizing prisms. Either type may be used as the optical splitter-combiner 42.

The optical circulator 48 has a first input/output port 48-1 for input of auxiliary signal light, a second input/output port 48-2 from which input light received at the first input/output port 48-1 is coupled into the first WDM filter 50, and a third input/output port 48-3 for output of light received at the second input/output port 48-2.

The auxiliary signal light output from the second input/output port 48-2 of the optical circulator 48 is combined with the excitation light in the first WDM filter 50; then the combined auxiliary signal light and excitation light are input to the first input/output port 42-1 of the optical splitter-combiner 42. One example of a preferred type of first WDM filter 50 is an AWG filter. Another type of first WDM filter 50 that may be used is an optical bandpass filter having a dielectric multilayer film. Excitation light is input to the transmitting port of the optical bandpass filter, auxiliary signal light is input to the reflecting port, and the combined excitation light and auxiliary signal light are output from the common port. In the following description, it will be assumed that an optical bandpass filter having a dielectric multilayer film is used as the first WDM filter 50.

After the combined excitation light and auxiliary signal light leave the first WDM filter 50 and enter the optical splitter-combiner 42, their p-polarized component is output from the second input/output port 42-2 of the optical splitter-combiner 42, while their s-polarized component is output from the third input/output port 42-3 of the optical splitter-combiner 42. For a reason given below, the p-polarized component and the s-polarized component of the excitation light exiting the optical splitter-combiner 42 must have the same intensity. The polarization of the excitation light entering the first input/output port 42-1 the optical splitter-combiner 42 must therefore be adjusted so that the intensity ratio of the p-polarized and s-polarized components is 1:1. Input excitation light that has been adjusted in this way will be referred to as 45° polarized excitation light. This type of excitation light can be easily obtained by use of a commercially available polarization controller.

As will be explained later, there is no corresponding restriction on the polarization state of the auxiliary signal light.

When a second-order nonlinear optical medium is used, the optical low-pass filter 54 has the function of rejecting the excitation light component of the SPDC process, or the SHG light component in the cascaded SHG/SPDC process.

Of the light that passes through the optical low-pass filter 54, at least the signal light component ($\lambda_s$), idler light component ($\lambda_i$), auxiliary signal light component ($\lambda_{s-2}$), and auxiliary idler light component ($\lambda_{i-2}$) are output on separate optical paths from the second WDM filter 52. A WDM filter of the AWG type that transmits at least these four wavelength components may be used as the second WDM filter 52.

The signal light and idler light wavelength components transmitted through the second WDM filter 52 are carried over the optical transmitting paths of, for example, an optical fiber communication network to respective receiving parties A and B. The receiving parties A and B then perform simultaneous measurement and other operations to communicate information by a known quantum information communication protocol.

The intensities of the auxiliary signal light and auxiliary idler light wavelength components transmitted through the second WDM filter 52 are detected by the first and second photodetectors 56, 58, respectively, and the resulting intensity signals are input to the control signal generating section 60. The control signal generating section 60 includes an output comparator 60-1 and a control signal generator 60-2. The auxiliary signal light intensity signal and auxiliary idler light intensity signal are input to the output comparator 60-1. A signal proportional to the ratio between the auxiliary signal light intensity and auxiliary idler light intensity is output from the output comparator 60-1 and input to the control signal generator 60-2. The control signal generator 60-2 generates one or more control signals that control at least one of the wavelength of the excitation light, the intensity of the excitation light, and the temperature of the nonlinear optical medium so as to bring the ratio of the two intensities, as indicated by the intensity ratio signal, to a preset value.

The operation of the quantum correlated photon pair generating device in the first embodiment will now be described on the assumption that the excitation light, auxiliary signal light, auxiliary idler light, signal light, and idler light input to the nonlinear optical medium 40 are linearly polarized and that their planes of polarization are all aligned in the same direction. If, for example, a PPLN crystal is used as the nonlinear optical medium 40, this alignment can be obtained by input of excitation light polarized in the Z-axis direction of the PPLN crystal and use of the PPLN crystal's $d_{33}$ second-order nonlinear optical coefficient, as also assumed in the following description.

The excitation light with wavelength $\lambda_p$ is output from the second input/output port 42-2 and the third input/output port 42-3 of the optical splitter-combiner 42 as a p-polarized component and an s-polarized component of mutually identical intensities. The PPLN crystal used as the nonlinear optical medium 40 is disposed in the second-order nonlinear optical medium 102 so that the polarization direction of the p-polarized component corresponds to the Z-axis of the PPLN crystal.

First, the process that takes place as the excitation light propagates on the optical loop 46 in the clockwise direction will be described. This excitation light is the excitation light component output from the second input/output port 42-2 as p-polarized light.

If only a single-stage SPDC process takes place, it generates correlated photon pairs consisting of a signal photon and an idler photon, both p-polarized. If a cascaded SHG/SPDC process is used, the p-polarized excitation light generates p-polarized SHG light, which then generates p-polarized photon pairs. In either case, the p-polarized component of the auxiliary signal light interacts with the p-polarized excitation light or p-polarized SHG light to produce p-polarized auxiliary idler light by DFG.

The excitation light, signal light, idler light, auxiliary signal light, and auxiliary idler light output from the PPLN crystal 40, all having the same p-polarization state, pass through the 90° polarization converter 44, in which their polarization is rotated by 90°. Entering the third input/output port 42-3 of the optical splitter-combiner 42 as s-polarized light, they are output from the first input/output port 42-1 of the optical splitter-combiner 42 as s-polarized light.

The excitation light that travels clockwise around the optical loop 46 accordingly causes output of correlated photon pairs consisting of s-polarized signal photons and idler photons and output of s-polarized auxiliary signal light and auxiliary idler light from the first input/output port 42-1 of the optical splitter-combiner 42.

Next, the process that takes place as the excitation light output as s-polarized light from the third input/output port 42-3 of the optical splitter-combiner 42 propagates on the optical loop 46 in the counterclockwise direction will be described. This excitation light passes through the 90° polarization converter 44, in which its plane of polarization is rotated by 90°, and becomes p-polarized light. If an s-polarized auxiliary signal light component is present, it also has its polarization plane rotated by 90° and becomes p-polarized light. When the excitation light and auxiliary signal light enter the PPLN crystal 40, accordingly, their polarization plane is aligned with the Z-axis of the PPLN crystal. The excitation light traveling counterclockwise around the optical loop 46, like the excitation light traveling clockwise, therefore generates correlated photon pairs consisting of signal photons and idler photons by SPDC, and auxiliary idler light is generated by DFG.

If light loss in the 90° polarization converter 44 is ignored, the intensity of the excitation light entering the PPLN crystal 40 while traveling clockwise around the optical loop 46 is the same as the intensity of the excitation light entering the PPLN crystal 40 while traveling counterclockwise.

Given that the excitation light entering the PPLN crystal 40 in both the clockwise and counterclockwise directions has the same plane of polarization and the same intensity, if the structure of the PPLN crystal is point symmetric about its center, the probability of generation of light by SPDC, or SHG and SPDC, in the PPLN crystal will be the same for both the excitation light traveling clockwise and the excitation light traveling counterclockwise. This also applies to the generation of auxiliary idler light by DFG, or SHG and DFG.

The excitation light, signal light, idler light, auxiliary signal light, and auxiliary idler light output from the PPLN crystal in the counterclockwise direction enter the second input/output port 42-2 of the optical splitter-combiner 42 as p-polarized light, and are therefore output from the first input/output port 42-1 of the optical splitter-combiner 42 as p-polarized light. The excitation light that travels counterclockwise around the optical loop 46 accordingly causes output of correlated photon pairs consisting of p-polarized signal photons and idler photons and output of p-polarized auxiliary signal light and auxiliary idler light from the first input/output port 42-1 of the optical splitter-combiner 42.

If the intensity of the excitation light is sufficiently weak, the polarization state of each signal-idler photon pair output from the first input/output port 42-1 of the optical splitter-combiner 42 is a superposition of an s-polarized state produced by clockwise travel and a p-polarized state produced by counterclockwise travel around the optical loop 46. Although each photon may show either one of the two states when its polarization is measured, the signal and idler photons both show the same state if their polarization is measured simultaneously in the same way. The quantum entangled photon pair generating device in the first embodiment therefore generates polarization entangled photon pairs.

The intensity of the auxiliary signal light output from the optical loop 46 is constant regardless of the polarization state of the auxiliary signal light input to the optical loop 46. Since the efficiency with which auxiliary idler light is generated is the same for both auxiliary idler light traveling clockwise and auxiliary idler light traveling counterclockwise, the intensity of the auxiliary idler light output from the optical loop 46 is also the same regardless of the polarization state of the auxiliary signal light input to the optical loop 46. Since the conversion efficiency is the same and the output intensity of the auxiliary idler light output from the optical loop 46 does not depend on the polarization state of the auxiliary idler light, polarization control of the auxiliary signal light is unnecessary.

The excitation light, signal light, idler light, auxiliary signal light, and auxiliary idler light output from the first input/output port 42-1 of the optical splitter-combiner 42 next enter the first WDM filter 50, where ideally the entire excitation light component is transmitted through and output from the transmitting port. The auxiliary signal light, auxiliary idler light, signal light, and idler light are output from the reflecting port, traverse the optical circulator 48, and are output from the third input/output port 48-3 of the optical circulator 48. The optical low-pass filter 54 rejects the remaining excitation light component, which has substantially half the wavelength of the signal light and idler light components.

Of the light that passes through the optical low-pass filter 54, at least the signal light component ($\lambda_s$), idler light component ($\lambda_i$), auxiliary signal light component ($\lambda_{s\text{-}2}$), and auxiliary idler light component ($\lambda_{i\text{-}2}$) are output on separate optical paths, as noted above.

The second WDM filter 52 must have sufficient wavelength separation capability that no extraneous wavelength components are mixed with the output on these separate paths. This condition can be met if, for example, a WDM filter of the AWG type that transmits at least these four wavelength components is used as the second WDM filter 52. This type of filter may also be combined with a fiber Bragg grating or the like to ensure adequate suppression of the excitation light wavelength component.

The signal light and idler light wavelength components transmitted through the second WDM filter 52 may be used as polarization entangled correlated photon pairs to communicate information by a known quantum information communication protocol. The intensities of the auxiliary signal light and auxiliary idler light wavelength components transmitted through the second WDM filter 52 are detected by the first and second photodetectors 56, 58, respectively, and the resulting intensity signals are input to the control signal generating section 60 to be processed as already described.

By operating with feedback control using the intensity of the auxiliary idler light or, preferably, the auxiliary light intensity ratio, the quantum correlated photon pair generating device in the first embodiment outputs polarization entangled correlated photon pairs at a constant average rate. Although only the SPDC process has been dealt with in detail in the preceding description, it will be appreciated that similar feedback control can be used, with similar effect, when SFWM is employed.

When the quantum correlated photon pair generating device is designed to use the cascaded SHG/SPDC process in a second-order nonlinear optical medium, the optical low-pass filter 54 is used mainly to reject SHG light. The wavelengths of the excitation light, signal light, idler light, auxiliary signal light, and auxiliary idler light are now all in the same general wavelength band, but if the second WDM filter 52 has adequate wavelength separation performance and can adequately reject the strong excitation light component, the same effects can be expected as when the ordinary single-stage SPDC process is used.

Similarly, the quantum correlated photon pair generating device can be designed to use the SFWM process in a third-order nonlinear optical medium. In this case there is no light in the half-wavelength region that was occupied by the excitation light in the single-stage SPDC process and the SHG light in the cascaded SHG/SPDC process, so the optical low-pass filter 54 is unnecessary.

As when the cascaded SHG/SPDC process is used, the wavelengths of the excitation light, signal light, idler light, auxiliary signal light, and auxiliary idler light are all in the same general wavelength band, but if the second WDM filter 52 has adequate wavelength separation performance and can adequately reject the strong excitation light component, the same effects can be expected as when the ordinary single-stage SPDC process is used. The auxiliary idler light is generated by an SFWM process.

Although the control mechanism by which the control signal output from the control signal generating section 60 of the quantum correlated photon pair generating device is used to control at least one of the excitation light intensity, excitation light wavelength, and nonlinear optical medium temperature is not shown in FIG. 7, there are well known algorithms by which the control signal can be used to control the excitation light intensity, excitation light wavelength, and the temperature of the nonlinear optical medium.

Second Embodiment

The structure and operation of a quantum correlated photon pair generating device according to a second embodiment of the invention will be described with reference to FIG. 8. In contrast to the quantum correlated photon pair generating device in the first embodiment, which generated polarization entangled quantum counterclockwise, the quantum correlated photon pair generating device in the second embodiment generates time-bin entangled quantum correlated photon pairs. Despite this difference, the quantum correlated photon pair generating devices in the first and second embodiments share many common elements, repeated descriptions of which will be omitted.

Time-bin entangled photon pairs are described, for example, by Inoue in Kogakukei no tame no ryoshi kogaku (Quantum optics for engineering systems), Morikita shuppan, first edition, first printing Feb. 6, 2008, pp. 154-156.

As shown in FIG. 8, dual light pulses are output from an excitation light source 62 to a nonlinear optical medium 40. If the excitation light pulses have an appropriate peak intensity, the quantum state of the correlated photon pairs generated by the SPDC process, cascaded SHG/SPDC process, or SFWM process in the nonlinear optical medium 40 is a superposition of a state arising from the first pulse of excitation light and a state arising from the second pulse of excitation light, and the photons are said to be time-bin entangled. A second-order nonlinear optical medium is selected as the nonlinear optical medium 40 when the device operates by SPDC or cascaded SHG/SPDC, and a third-order nonlinear optical medium is selected as the nonlinear optical medium 40 when the device operates by SFWM.

The method by which the expected value of the number of correlated photon pairs arising from the first and second pulses of excitation light is stabilized is the same as the method used in the quantum correlated photon pair generating device in the first embodiment.

Pulses of excitation light, signal and idler light forming correlated photon pairs, auxiliary signal light, and auxiliary idler light are output from the nonlinear optical medium 40. The auxiliary signal light may be either pulsed or continuous, but in this embodiment, since the excitation light is pulsed, the auxiliary idler light is also pulsed.

The light output from the nonlinear optical medium 40 passes through an optical low-pass filter 54, and then is separated by a second WDM filter 52 into a signal light component ($\lambda_s$), an idler light component ($\lambda_i$), an auxiliary signal light component ($\lambda_{s\text{-}2}$), and an auxiliary idler light component ($\lambda_{i\text{-}2}$), which are output on separate optical paths, the signal light component and idler light component forming temporally correlated photon pairs.

The intensities of the auxiliary signal light and auxiliary idler light wavelength components transmitted through the second WDM filter 52 are detected by respective first and second photodetectors 56, 58, and the resulting intensity signals are input to a control signal generating section 60 and processed as in the first embodiment. The control signal or signals output from the control signal generating section 60 control at least one of the wavelength of the excitation light, the intensity of the excitation light, and the temperature of the nonlinear optical medium as described in the first embodiment so that temporally correlated photon pairs are generated at a steady and reliable rate.

The invention is not limited to the use of a second-order nonlinear optical effect in a PPLN crystal. Second-order or third-order nonlinear optical effects in other nonlinear optical media may be used. The nonlinear optical medium may be, for example, an optical fiber or silicon wire that exhibits third-order nonlinear optical effects. Provided suitable changes are made in the transmission characteristics of the WDM filters 52, 54, the same effects are obtained as from the quantum correlated photon pair generating devices in the first and second embodiments.

The means by which excitation light and auxiliary signal light are input to the nonlinear optical medium are not limited to the first WDM filter 50 shown in the first and second embodiments. For example, an optical coupler may be used to combine the excitation light and auxiliary signal light. The alignment of the polarization plane of the excitation light with the optical axes of the nonlinear optical medium is also a design choice, depending on which tensor component of the nonlinear optical coefficient tensor is used.

The 90° polarization converter 44 in the first embodiment that rotates the polarization plane of the excitation light and other light by 90° need not be a half-wave plate. In particular, when the pure SPDC process is used in a second-order nonlinear optical medium, a half-wave plate cannot be used, because a plate functioning as a half-wave plate for the excitation light would function as a quarter-wave plate for the signal light and other components having twice the wavelength of the excitation light, and the desired 90° rotation of the polarization plane would not be obtained. Conversely, a plate functioning as a half-wave plate for the signal light and other light of substantially the same length would function as a full wave plate for the excitation light, again failing to produce the desired 90° rotation of the polarization plane. When the pure SPDC process is used in a second-order nonlinear optical medium, accordingly, other means of obtaining a 90° rotation of the polarization plane must be used. For example, a fiber splice may be used.

Those skilled in the art will recognize that further variations are possible within the scope of the invention, which is defined in the appended claims.

What is claimed is:

1. A method of generating correlated photon pairs, comprising:
   simultaneously inputting excitation light and auxiliary signal light to a nonlinear optical medium, input of the excitation light causing quantum correlated photon pairs to be generated by spontaneous parametric fluorescence, each quantum correlated photon pair including a signal photon and an idler photon, input of the auxiliary signal light and the excitation light causing auxiliary idler light to be generated by a stimulated parametric conversion process;
   detecting intensities of the auxiliary idler light and the auxiliary signal light output from the nonlinear optical medium; and
   controlling at least one of an intensity of the excitation light, a wavelength of the excitation light, and a temperature of the nonlinear optical medium according to the detected intensities of the auxiliary idler light and the auxiliary signal light, thereby holding a ratio of the detected intensities at a preset value.

2. A method of generating correlated photon pairs, comprising:
   simultaneously inputting excitation light and auxiliary signal light to a nonlinear optical medium, input of the excitation light causing quantum correlated photon pairs to be generated by spontaneous parametric fluorescence, each quantum correlated photon pair including a signal photon and an idler photon, input of the auxiliary signal light and the excitation light causing auxiliary idler light to be generated by a stimulated parametric conversion process;
   detecting an intensity of the auxiliary signal light output from the nonlinear optical medium; and
   controlling at least one of an intensity of the excitation light, a wavelength of the excitation light, and a temperature of the nonlinear optical medium according to the detected intensity of the auxiliary idler light so as to hold the detected intensity at a preset value.

3. A quantum correlated photon pair generating device comprising:
   a nonlinear optical medium for generating quantum correlated photon pairs from excitation light by spontaneous parametric fluorescence and generating auxiliary idler light from auxiliary signal light by stimulated parametric conversion, each quantum correlated photon pair including a signal photon and an idler photon;
   an optical demultiplexer for separating at least the auxiliary signal light and the auxiliary idler light and outputting the auxiliary signal light and the auxiliary idler light on separate optical paths;
   an excitation light source for generating the excitation light;
   an auxiliary signal light source for generating the auxiliary signal light;
   an optical combiner for combining the excitation light and the auxiliary signal light to generate combined light;
   a first optical coupler for coupling the combined light into the nonlinear optical medium;
   a second optical coupler for coupling light output from the nonlinear optical medium into the optical demultiplexer;
   a first photodetector for detecting intensity of the auxiliary signal light output from the optical demultiplexer;
   a second photodetector for detecting intensity of the auxiliary idler light output from the optical demultiplexer; and
   a control signal generating section for generating a control signal for controlling at least one of an intensity of the excitation light, a wavelength of the excitation light, and a temperature of the nonlinear optical medium so as to bring a ratio of the intensity of the auxiliary signal light and the intensity of the auxiliary idler light to a preset value.

4. The quantum correlated photon pair generating device of claim 3, wherein the optical demultiplexer also separates the signal light and the idler light from the light output from the nonlinear optical medium and outputs the signal light and the idler light on further separate optical paths.

5. The quantum correlated photon pair generating device of claim 4, wherein the optical demultiplexer includes a wavelength selective filter.

6. The quantum correlated photon pair generating device of claim 5, wherein the wavelength selective filter includes an arrayed waveguide grating.

7. The quantum correlated photon pair generating device of claim 3, further comprising an optical low-pass filter disposed between the nonlinear optical medium and the first and second photodetectors for rejecting light having a wavelength equal to substantially one-half of a wavelength of the signal light and the idler light.

8. The quantum correlated photon pair generating device of claim 3, further comprising:
   an optical splitter-combiner having a first input/output port, a second input/output port, and a third input/output port;
   an optical loop interconnecting the second and third input/output ports of the optical splitter-combiner, the nonlinear optical medium being disposed within the optical loop, the optical demultiplexer being external to the optical loop; and
   a 90° polarization converter disposed in the optical loop, for rotating a polarization plane of light passing through the 90° polarization converter by ninety degrees; wherein
   the excitation light and the auxiliary signal light enter the optical splitter-combiner at the first input/output port and travel around the optical loop, passing through the nonlinear optical medium and the 90° polarization converter, and the signal light, the idler light, the auxiliary signal light, and the auxiliary idler light then exit the optical splitter-combiner from the first input/output port;
   the second input/output port of the optical splitter-combiner operates as the first optical coupler for the excitation light and the auxiliary signal light traveling around the optical loop in a first direction and operates as the second optical coupler for the excitation light and the auxiliary signal light traveling around the optical loop in a second direction opposite to the first direction; and
   the third input/output port of the optical splitter-combiner operates as the first optical coupler for the excitation light and the auxiliary signal light traveling around the optical loop in the second direction and operates as the second optical coupler for the excitation light and the auxiliary signal light traveling around the optical loop in the first direction.

9. The quantum correlated photon pair generating device of claim 3, wherein the excitation light source generates the excitation light as dual pulsed excitation light, and the quantum correlated photon pairs are time-bin entangled.

* * * * *